Figure 1:
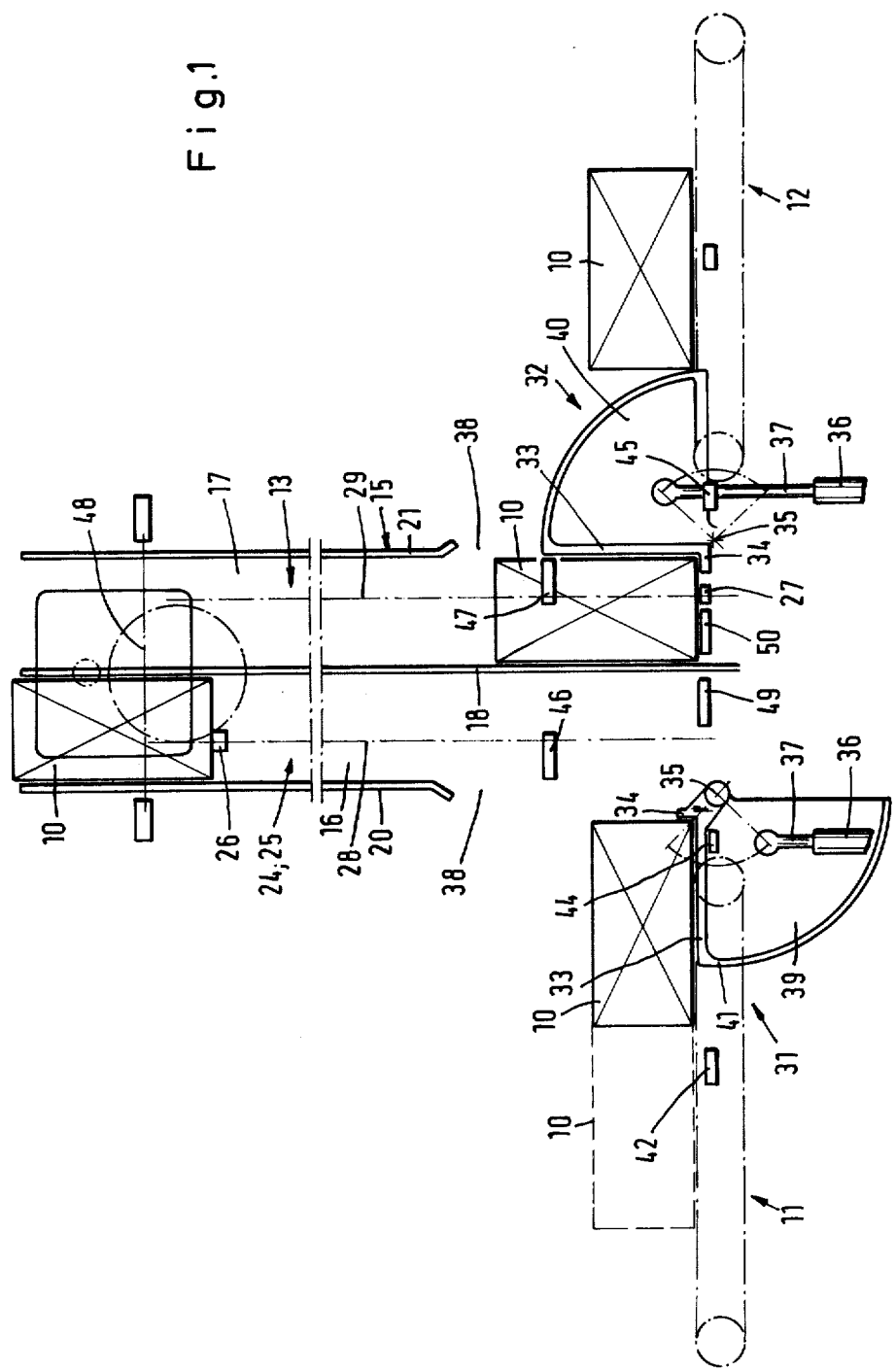

United States Patent [19]

Focke et al.

[11] Patent Number: 4,487,308
[45] Date of Patent: Dec. 11, 1984

[54] APPARATUS FOR THE TRANSPORT OF PACKS

[75] Inventors: Heinz Focke; Klaus Haenel, both of Verden, Fed. Rep. of Germany

[73] Assignee: Focke & Co., Verden, Fed. Rep. of Germany

[21] Appl. No.: 387,126

[22] Filed: Jun. 10, 1982

[30] Foreign Application Priority Data

Jul. 16, 1981 [DE] Fed. Rep. of Germany ...... 3128131

[51] Int. Cl.³ .......................................... B65G 25/04
[52] U.S. Cl. .................................. 198/412; 198/801
[58] Field of Search .............. 198/801, 412, 413, 482, 198/570, 796, 748, 422

[56] References Cited

U.S. PATENT DOCUMENTS

| 2,274,842 | 3/1942 | McCann | 198/796 |
| 2,885,098 | 5/1959 | Nesseth | 198/801 |
| 2,908,498 | 10/1959 | Becraft | 198/801 |
| 3,184,032 | 5/1965 | Jonsson | 198/801 |
| 3,200,935 | 8/1965 | Whitfield | 198/801 |
| 3,235,101 | 2/1966 | Milhaupt | 198/796 |
| 3,593,862 | 7/1971 | Pierson | 198/796 |
| 3,912,254 | 10/1975 | Woodruff | 198/422 |

FOREIGN PATENT DOCUMENTS

| 75109 | 12/1918 | Austria | 198/796 |
| 1051729 | 2/1959 | Fed. Rep. of Germany | 198/796 |
| 2725536 | 12/1978 | Fed. Rep. of Germany | 198/801 |

Primary Examiner—Leslie J. Paperner
Assistant Examiner—Daniel R. Alexander
Attorney, Agent, or Firm—Sughrue, Mion, Zinn, Macpeak, and Seas

[57] ABSTRACT

For the transport of packs in packaging systems, especially for vertical transport, an efficient elevator conveyor system which transports the packs carefully is proposed. These are supplied alternately from two different sides to a common elevator conveyor which has engaging pieces (supporting arms) movable up and down for the packs.

7 Claims, 2 Drawing Figures

APPARATUS FOR THE TRANSPORT OF PACKS

DESCRIPTION

The invention relates to an apparatus for the transport of articles, especially large packs, in connection with packaging machines.

It frequently arises, and in many ways, that articles, especially packs themselves, have to be transported within packaging systems so that they can be conveyed out of the packaging machine or fed to other packaging units. The invention is concerned with the transport of individual articles. In particular, it relates to the conveyance of large packs, specifically so-called large bundles of cigarette packs.

The object on which the invention is based is to propose a conveying apparatus of the type mentioned in the introduction, by means of which the articles or packs can be conveyed carefully, whilst still maintaining a high output and speed. The construction and mode of operation of the apparatus would also be simple and clearly understandable, and it will have low susceptibility to faults.

To achieve this object, the apparatus according to the invention is characterised in that the articles are transportable on at least two conveyor tracks by means of a common conveyor which is movable to and fro and which moves the articles alternately on one conveyor track and on the other.

The conveyor is preferably an endless conveyor, for example a chain conveyor, which has engaging pieces for the articles to be conveyed. A side of this chain conveyor is assigned respectively to each conveyor track. A motor (reversing motor) causes the chain conveyor to be driven to and fro, so that in each cycle of movement an article is conveyed and, at the same time, the engaging pieces of the other conveyor track return to the initial position.

A conveying apparatus of the type mentioned above is especially advantageous for the upward-directed, especially vertical transport of articles (large packs) from a lower feed plane to a higher discharge plane. The endless conveyor serves, here, as an elevator conveyor to which the articles are supplied in the lower region by means of transverse feed belts conveying in opposite directions, whilst in an upper region the articles are brought onto a common discharge track. Seen in horizontal projection, this is offset 90° relative to the feed belts.

According to a further feature of the invention, the elevator conveyor is located in a vertical housing with an approximately central partition wall for delimiting the two conveyor tracks from one another. The elevator conveyor consisting preferably of two chain conveyors driven together is located outside the region of the conveyor tracks within the vertical housing, the engaging pieces being designed as transversely projecting jutting-out supporting arms for the articles.

The transfer of the articles from the feed belts to the elevator conveyor is especially important. Here, according to the invention, the articles are rotated 90° into an upright position in the case of cuboid articles. For this purpose, a pivotable pack holder adjoins the end of each of the feed belts. This is made essentially in the form of a table. The articles conveyed onto the pack holder from the feed belt are brought, as a result of pivoting of the holder through 90°, into the required position for being engaged and transported further by the elevator conveyor.

Further features of the invention relate to the constructive design of the elevator conveyor together with the associated units and to the control of the cycles of movement.

Figure 2:
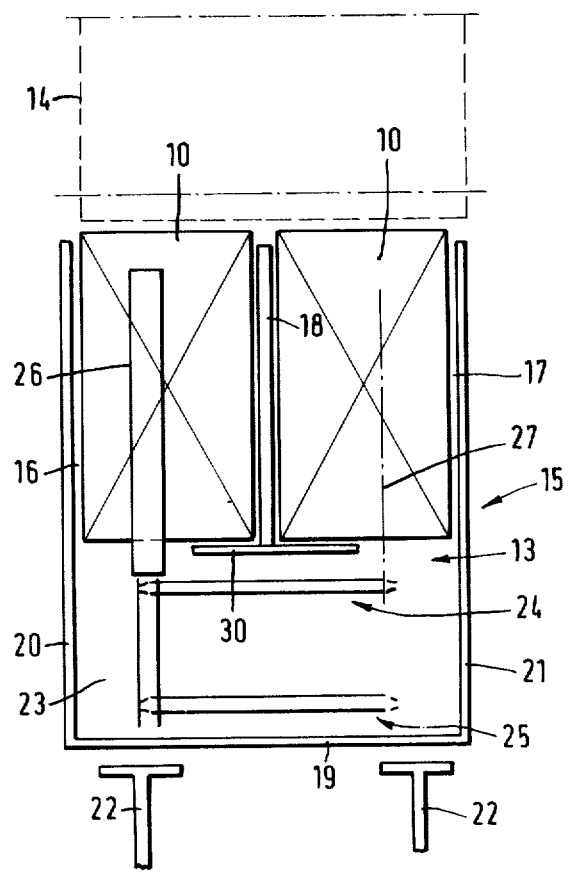

An exemplary embodiment of the invention is explained in more detail below with reference to the drawings in which:

FIG. 1 shows, in a greatly simplified side view or in a vertical section, an apparatus with an elevator conveyor for the transport of large packs, FIG. 2 shows, in horizontal projection, a detail (elevator conveyor) of the apparatus according to FIG. 1.

The apparatus illustrated in the drawings is especially suitable for the upward-directed transport of large (cigarette) packs 10. These are supplied on a lower plane from two sides located opposite one another, specifically, in the present case, by means of feed belts 11 and 12 conveying in opposite directions to one another. These constantly revolving conveyors can come from two separate packaging machines (bundle packers), so that the results of production from two packaging machines come together here.

The large packs 10 are conveyed closely to one another on the feed belts 11, 12. The particular large pack 10a or 10b respectively located at the front is transferred to an elevator conveyor 13 which lifts the large packs 10 to a distinctly higher level. Here, particularly in the upper region of the elevator conveyor 13, the large packs 10 are pushed off in succession in a transverse direction, for example on a discharge conveyor 14 designed as a conveyor belt or the like. In the example shown, when seen in horizontal projection this is arranged offset 90° relative to the feed belts 11,12 (FIG. 2).

The elevator conveyor 13 is designed in a special way. Two (vertical) conveyor tracks 16 and 17 are formed in a vertical box-shaped housing 15. These are divided off from one another by an approximately central vertical partition wall 18. This extends over the full height of the elevator conveyor 13, specifically in the lower region to below the transport plane of the articles which is predetermined by the feed belts 11, 12. As a result, the partition wall 18 acts, at the same time, as an inner stop for the large packs 10 during introduction into the elevator conveyor and as a guide surface during vertical transport.

As is evident from FIG. 2, in the present case the housing 15 is made approximately U-shaped, namely with a rear wall 19 and side walls 20,21 directed transversely to this. In the present case, the housing 15 is open on the side located opposite the rear wall 19. As a result, in the upper region the large packs 10 can be pushed out of the housing 15 and onto the discharge conveyor 14, for example by slides 22. In the present case, a separate slide 22 is assigned to each conveyor track 16, 17.

Here, the interior of the housing 15 is larger than the cross-section of the conveyor tracks 16,17 which is predetermined by the dimensions of the large packs 10. This results in a vertical shaft space 23 next to the conveyor tracks 16, 17. The shaft space 23 serves, here, for receiving the conveying members for the large packs. The present exemplary embodiment is equipped with (endless) chain conveyors 24 and 25. Here, the two chain conveyors 24, 25 are arranged next to one another in parallel vertical planes and work as a common conveying member. Engaging pieces for the large packs 10, in the present case supporting arms 26 and 27, are connected to the (vertical) sides 28 and 29 of the two chain conveyors 24, 25 running at a distance from one another. As a result, the supporting arms 26, 27 projecting and jutting out on one side have the necessary load-bearing capacity, without the chain conveyors 24, 25 being located in a region interfering with horizontal feed and discharge and vertical conveyance. The shaft-shaped or channel-shaped conveyor tracks 16, 17 are delimited from the shaft space 23 by a guide wall 30 which extends transversely to the partition wall 18 and is connected to this. The partition wall 18 and guide wall 30 thus form a T-shaped inner profile within the housing 15. The large packs 10 are guided and supported within the conveyor tracks 16, 17 on all sides with the exception of the open front side.

The elevator conveyor 13 formed essentially by the chain conveyors 24, 25 is driven to and fro, namely for the supporting arms 26, 27 to move up and down. The drive is provided by a known (electric) motor, not shown in detail here, with a reversible driving direction. Each side 28, 29 is equipped with a supporting arm 26 and 27 respectively. The relative position of the supporting arms is selected so that one of them is located in the lower receiving position (supporting arm 27 in FIG. 1) during the time when the other supporting arm (supporting arm 26 in FIG. 1) has reached the upper end position. The supporting arms 26, 27 are movable to and fro between the end positions illustrated, specifically by means of a corresponding drive of the chain conveyors 24, 25. During the upward movement of a supporting arm 26, 27 a particular large pack 10 is carried along in an upward direction, whilst the other supporting arm runs back idly.

The large packs 10 are transferred from the feed belts 11, 12 to the elevator conveyor 13 in a special way. In the present case, the large packs 10 are tilted or rotated 90°. This tilting movement also brings about a proper exact positioning of the large pack 10 on the particular supporting arm 26, 27 located in the lower receiving position.

A pivotable pack holder 31,32 is provided for this purpose in the end region facing the elevator conveyor 13. In the present exemplary embodiment, the cross-section of this pack holder is made angular. A relatively long supporting leg 33 horizontal in the initial position extends with its top side in the plane of the feed belt 11 or 12 respectively so that the large pack 10 can be conveyed directly onto the pack holder by means of the feed belt 11, 12. A shorter or smaller stop leg 34 is arranged vertically in the initial position and serves as a stop for determining the correct position of the large pack 10 on the pack holder 31, 32.

The pack holder 31, 32 designed in this way is pivotable about a transversely directed axis 35, for example by means of a pressure-medium cylinder 36 extending underneath the pack holder 31,32. This cylinder causes a pivoting movement as a result of the vertical extension and retraction of a piston rod 37.

The relative position of the pack holder 31,32 in relation to the elevator conveyor 13 is selected so that, after pivoting 90°, the upright large pack 10 stands on the stop leg 34. The now vertical supporting leg 33 forms a lateral limitation for the elevator conveyor 13, namely approximately as a prolongation of the side wall 20,21. This is provided, in this region, with an orifice 38 of appropriate dimensions. The large pack 10 thereby receives support and guidance in the region of transfer to the elevator conveyor 13. The relative position is such that the large pack 10 rests against the partition wall 18 and is thus fixed firmly. The supporting arm 26 or 27 respectively is located in a position immediately below the large pack 10, so that at the start of the conveying cycle the latter is carried along in an upward direction.

The large packs 10 are appropriately supplied close to one another, that is to say without any distance from one another, on the feed belts 11,12. As a result, the particular large pack 10 located at the front is pushed onto the pack holder 31,32 held in readiness.

So as to hold back the following large packs 10 on the particular feed belt 11, 12 during the pivoting movement, namely in a position guaranteeing sufficient distance for the return movement of the pack holder 31, 32 to the initial position, a holding back device is moved into the path of movement of the large packs 10. In the present case, there is on the underside or outerside of the pack holder 31,32 a stop segment 39,40 which is movable with the latter. This is designed with an outer supporting face 41 which is in the form of an arc, especially a circular arc, and which, during the pivoting movement of the pack holder 31, 32 into the vertical position (on the right in FIG. 1), passes into the path of movement of the large packs 10. The segment-like shape of the stop segment 39,40 guarantees that the following large packs 10 are retained in the given position even at the very start of the pivoting movement. The stop segments 39,40 or their supporting face 41 slide along on the front side of the facing (front) large pack 10.

The apparatus described thus far works in alternating operation as regards the conveyor tracks 16,17, etc. The cycles of movement take place automatically as a result of an appropriate arrangement of switching and monitoring elements.

Located in the region of the feed belts 11 and 12, at an appropriate distance from the pack holders 31, 32 are monitoring switches 42 and 43 which ensure that, in addition to the particular large pack 10 received by a pack holder 31,32, at least one further large pack 10 is located on the feed belt 11 or 12 respectively. Further, switches 44 and 45 are arranged in the region of the pack holders 31,32 in such a way that the pivoting movement of these is initiated only when the particular large pack assumes the exact end position on the pack holder 31,32. As a result, the precise introduction of the large pack 10 into the elevator conveyor 13 is guaranteed. The switches 44 and 45 trigger the pivoting movement of the pack holders 31,32.

Further switches 46 and 47 in the region of the elevator conveyor 13 are assigned to the pack holders 31,32. These switches are activated by the respective pack holder 31,32 when the exact (vertical) position is reached and when the large pack 10 is consequently in the proper position within the elevator conveyor 13. Finally, monitoring switches in the form of a light barrier 48 are provided in the upper pushing-off region of the elevator conveyor 13. These are actuated as a function of the large pack 10 being pushed off after reaching its upper end position.

The servo-motor (not shown) for the elevator conveyor 13 is actuated as a function of all the switching elements 42 to 48 described. Only when these have been activated without exception does the servomotor receive the starting signal.

At the end of an upward movement of the elevator conveyor 13 the drive motor receives a precise stopping signal. This is triggered by the approach of the particular descending supporting arm 26, 27 to appropriately arranged proximity switches 49 and 50. The drive motor is thereby stopped in an exact position.

By means of an appropriate switching arrangement, the apparatus is operational even when large packs 10 are supplied from one side only, that is to say when one of the feed belts 11, 12 does not supply any large packs 10. In this case, as described, the monitoring switches 42, 43, the switches 44, 45, 46 and 47 and the light barrier 48 are actuated in the conventional way, so that the drive motor is set in motion. Furthermore, the motor is stopped in the way described by means of the proximity switch 49, 50. When large packs 10 are missing on one of the feed belts 11,12, the further functions arise due to the fact that the monitoring switch 42 or 43 assigned to the particular "empty" feed belt 11 or 12 is not stressed and thus triggers corresponding reactions at the remaining switches.

We claim:

1. An apparatus for the transport of articles, especially large packs, in connection with packaging machines, said apparatus comprising:
   longitudinally spaced, first and second oppositely driven horizontal conveyors at a common level, in line and facing each other for feeding articles towards each other and into the space between the facing ends of the first and second horizontal conveyors,
   an endless vertical elevator conveyor positioned within the space between the facing horizontal conveyors to define two side by side vertical conveyor tracks extending across the ends of the first and second horizontal conveyors,
   said vertical elevator conveyor including engaging pieces spaced from each other and movable to underlie and engage articles moving off the horizontal conveyors towards said conveyor tracks from opposite sides of said vertical elevator conveyor and for supporting said articles for movement vertically upwardly within said conveyor tracks,
   means for effecting alternating rotational movement of said endless vertical elevator conveyor, such that said articles are moved as received alternately from said first and second horizontal conveyors at said first level to a second raised level on said vertical elevator conveyor, and
   means for removing said articles from said conveyor tracks from said endless vertical elevator conveyor at both conveyor tracks at said second level.

2. The apparatus according to claim 1, wherein said endless vertical elevator conveyor comprises an endless chain conveyor forming a pair of vertical chain runs within respective conveyor tracks, and wherein said engaging pieces are fixed to said endless chain conveyor and project outwardly at right angles thereto for underlying and engaging said articles as they move off said first and second horizontal conveyors.

3. The apparatus as claimed in claim 2, wherein a vertical, box-shaped housing confines said endless vertical elevator conveyor, and wherein a vertical partition wall within said vertical box-shaped housing and positioned between said vertical chain runs functions with said vertical box-shaped housing to guide said packs as they are transported vertically from said first level to said second level.

4. The apparatus according to claim 1, further comprising means at the ends of said first and second horizontal conveyors between said horizontal conveyors and said endless vertical elevator conveyor for transferring said articles from said horizontal conveyors to said endless vertical elevator conveyor, and for tilting said articles 90 degrees during such transfer.

5. The apparatus as claimed in claim 4, wherein said transfer means each comprise a pack holder mounted for pivoting about a horizontal axis by 90 degrees and including supporting legs movable into a position underlying said packs and terminating in a right angle stop projecting from said supporting legs for preventing further movement of said pack towards said endless vertical elevator conveyor after leaving said horizontal conveyor and facilitating tilting of said pack through 90 degrees, and means for rotating said pack holders through 90 degrees such that the end of the pack abutting the stop is vertically supported by the stop after rotation of the pack holder to a position upending the pack.

6. The apparatus as claimed in claim 5, further comprising a holding back device for holding back following articles from the one being transferred from the facing ends of said oppositely driven horizontal conveyors to the endlss vertical elevator conveyor.

7. The apparatus as claimed in claim 6, wherein said holding back device comprises for each pack holder, an arcuate surface extending from the support surface such that during rotation, said arcuate surface moves across the plane of transport of the articles on said facing ends of said first and second oppositely driven horizontal conveyors to prevent further horizontal movement of said succeeding articles in the direction of the endless vertical elevator conveyor until said pack holder is rotated back to a position where the following articles may move onto the support surface thereof.

* * * * *